US009013070B2

(12) United States Patent
Oldani et al.

(10) Patent No.: US 9,013,070 B2
(45) Date of Patent: Apr. 21, 2015

(54) APPARATUS FOR SECTIONING AN ELECTRIC ENERGY FLOW IN ONE OR MORE CONDUCTORS, AND AN ELECTRIC ENERGY GENERATING PLANT COMPRISING SAID APPARATUS

(75) Inventors: Renzo Oldani, Parabiago (IT); Claudio Nolli, Cremona (IT)

(73) Assignee: Energy Global Green Solutions S.p.A. (IT)

( * ) Notice: Subject to any disclaimer, the term of this patent is extended or adjusted under 35 U.S.C. 154(b) by 0 days.

(21) Appl. No.: 14/125,702

(22) PCT Filed: May 7, 2012

(86) PCT No.: PCT/IT2012/000133

§ 371 (c)(1),
(2), (4) Date: Dec. 12, 2013

(87) PCT Pub. No.: WO2012/176222

PCT Pub. Date: Dec. 27, 2012

(65) Prior Publication Data

US 2014/0116860 A1 May 1, 2014

(30) Foreign Application Priority Data

Jun. 13, 2011 (IT) .............................. MI2011A1057

(51) Int. Cl.
*H02J 1/00* (2006.01)
*H01H 35/24* (2006.01)
*H01H 35/38* (2006.01)

(52) U.S. Cl.
CPC ............... *H01H 35/24* (2013.01); *H01H 35/38* (2013.01); *H01H 2300/04* (2013.01)

(58) Field of Classification Search
USPC .......................................... 307/112, 119, 326
See application file for complete search history.

(56) References Cited

U.S. PATENT DOCUMENTS

| | | | | |
|---|---|---|---|---|
| 5,415,263 | A * | 5/1995 | Bessette | 192/130 |
| 6,222,284 | B1 * | 4/2001 | Hammond et al. | 307/125 |
| 7,308,829 | B1 * | 12/2007 | Beard et al. | 73/716 |

(Continued)

FOREIGN PATENT DOCUMENTS

EP 0883147 A2 12/1998

OTHER PUBLICATIONS

International Search Report issued in connection with PCT/IT2012/000133.

(Continued)

*Primary Examiner* — Daniel Cavallari
(74) *Attorney, Agent, or Firm* — Akerman LLP

(57) ABSTRACT

The present application describes an apparatus (1) for sectioning an electric energy flow in one or more conductors (15) of an electric energy generating plant (100), comprising a pneumatic circuit (4) that feeds a plurality of pneumatic remote switches (5), and a control unit (2) that controls such a pneumatic circuit (4); the pneumatic remote switches (5) intercept conductors (15) of an electric energy generating plant (100) and are able to interrupt the passage of current both for automatic safety intervention and for manual or automatic controlled intervention; it also describes an electric energy generating plant (100) comprising a plurality of electrical generators (6) connected in series and the aforementioned sectioning apparatus (1), the pneumatic remote switches (5) of which intercept at least one conductor (15) of such a plurality of electrical generators (6).

12 Claims, 5 Drawing Sheets

(56) References Cited

U.S. PATENT DOCUMENTS

2002/0084699 A1* 7/2002 Kemp ........................... 307/112
2002/0125772 A1* 9/2002 Kemp ........................... 307/140
2008/0294273 A1* 11/2008 Scharnick ....................... 700/19
2011/0101795 A1* 5/2011 Scharnick et al. ............ 307/326

OTHER PUBLICATIONS

Written Opinion issued in connection with PCT/IT2012/000133.

* cited by examiner

APPARATUS FOR SECTIONING AN ELECTRIC ENERGY FLOW IN ONE OR MORE CONDUCTORS, AND AN ELECTRIC ENERGY GENERATING PLANT COMPRISING SAID APPARATUS

This application is a national phase of PCT/IT2012/001399, filed May 7, 2012, and claims priority to MI2011A001057, filed Jun. 13, 2011, the entire contents of all of which are hereby incorporated by reference.

DESCRIPTION

1. Field of Application

The present invention concerns an apparatus for sectioning an electric energy flow in one or more conductors, as well as an electric energy generating plant comprising said apparatus.

2. Prior Art

As known, in electric energy plants comprising a plurality of generators connected in series (like for example batteries, accumulators, photovoltaic panels or similar) it is sometimes difficult to ensure the possibility of sectioning under load and not.

In many cases, for example in photovoltaic plants, the connections between the apparatuses are made with terminals and cable lugs clamped by means of screws, without the interposition of magnetic remote switches, since the latter do not offer sufficient guarantee of strength and longevity, in high-burden applications.

The safety conditions could only be attained with the addition of airtight containers, high quality insulating materials and other provisions that would make the plant very expensive.

For these reasons, a photovoltaic solar array or one with accumulators is always live, without the possibility of being deactivated remotely.

The only way to interrupt the electrical power supply is to intervene manually by unscrewing the live connections.

Such an operation is clearly very dangerous or impossible in the case of fire or when humidity is present.

It has already been found that during fires, in photovoltaic arrays installed on industrial buildings, teams of fire-fighters have not been able to intervene on the roofs with hoses because the live photovoltaic arrays, through the water, would have discharged the electrical energy into the pumping devices and particularly onto the people in contact with such equipment, with lethal consequences due to the high voltages of the plants.

Moreover, the flames, burning the insulation of the cables, allow the electrical energy produced by the panels to be dissipated at random, through the metallic structures or the guttering.

This is facilitated by the presence of water.

It is therefore only possible to intervene to put out these fires with powders, which, however, over large surfaces like those of industrial buildings, are not suitable for reasons of volume and technical application difficulties.

Even foams, for the same reasons as water, cannot be used to extinguish fires in the presence of live plants.

It must be kept in mind that the voltages involved in a photovoltaic plant are substantial.

In the case of domestic plants, a minimum of ten panels are used in series that, in an industrial plant, constitute a string of a plurality of strings.

Each panel delivers, on average, 200 Watts at about 30 Volts (usually the panels are about 230/240 W and 36 Volts).

Therefore, the power of each string varies from 2000 W to over 4000 W with voltages of between 300 and 1000 V.

The electric current considered harmless to the human body is 50 V and 1-2mA, beyond which phenomena of electrocoagulation and disturbances to the nervous system begin, with muscle contractions up to cardiac arrest.

Therefore, any photovoltaic plant, even the smallest one, greatly exceeds the voltage and current values considered harmless.

Another problem of known photovoltaic plants, operating for many years, lies in that the insulation systems may no longer be adequate and possible dispersions could endanger the safety of people that have to work on roofs for normal maintenance operations.

In other words, existing plants may be dangerous even without exceptional circumstances, such as a fire.

The above considerations also apply to electrical plants made with accumulators, like for example industrial continuity groups and similar plants.

SUMMARY OF THE INVENTION

The technical problem underlying the present invention is that of devising an apparatus for sectioning an electric energy flow in one or more conductors of an electric energy generating plant, capable of overcoming the problems of the prior art quoted above.

In this task, an object of the invention is to make a pneumatically-operating apparatus capable of intrinsically constituting a safety system in the case of fire, automatically interrupting the electrical connection between the various apparatuses.

Another object is that of making an apparatus that ensures greater longevity, with respect to known systems.

A further object of the invention is that of making an apparatus that makes it possible to carry out the interruption of the electric current with a manoeuvre that is either manual or automated, for example controlled by smoke sensors, temperature sensors, and other safety apparatuses.

The present apparatus, thanks to its special constructional features, is able to ensure high guarantees of reliability and of safety.

This and other objects, which will be highlighted more clearly hereafter, are achieved by an apparatus for sectioning an electric energy flow in one or more conductors of an electric energy generating plant, comprising: a pneumatic circuit that feeds a plurality of pneumatic remote switches; and a control unit that controls said pneumatic circuit.

The pneumatic remote switches intercept the conductors of the electric energy generating plant and are able to interrupt the passage of current both for automatic safety intervention and for manual or automatic controlled intervention.

The pneumatic remote switches are of the normally open type, so that the electrical contacts are only closed when the pneumatic circuit is under pressure.

Advantageously, the apparatus comprises at least one covering element made from plastic material, the tearing of which places the pneumatic circuit in communication with the outside.

Thus, in the case of fire or another accident that can damage the aforementioned covering element, there is an immediate loss of pressure of the pneumatic circuit and a consequent automatic sectioning of the live plant by means of the apparatus according to the invention.

It is clear to a person skilled in the art that any plastics or similar material with poor properties of fire-resistance can be used to obtain the technical effect described above.

The pneumatic circuit can advantageously comprise pipes made from plastic material, which thus concretize the above mentioned covering element made from plastic material.

The pneumatic remote switch can comprise a casing made from plastic material, which defines a first chamber in communication with the pneumatic circuit through an input, said pneumatic remote switch defining an electrical contact that is only closed when said first chamber is under pressure.

Also in this case, the casing made from plastic material can concretize the aforementioned tearable covering element, since the first chamber is in constant fluid communication with the pneumatic circuit.

The pneumatic remote switch can comprise two connectors inside it, arranged to establish the electrical contact, and a spring mechanism arranged to space apart said connectors, opening the electrical contact when there is no pressure inside the first chamber, due to an interruption in power supply or a tearing of one of said covering elements made from plastic material.

The control unit can control a control valve that connects said pneumatic circuit to a compressed air source.

The control unit can comprise one or more of the following devices: manostats intended to control the pressure conditions of the compressed air source and/or of the pneumatic circuit, danger sensors and timers for automatically switching on and off.

The technical problem underlying the present invention is also solved by an electric energy generating plant comprising a plurality of electrical generators connected in series and a sectioning apparatus according to the invention, the pneumatic remote switches of such an apparatus intercepting at least one conductor of said series of electrical generators.

The pneumatic remote switches can intercept the conductors that connect an electrical generator to the next electrical generator of the series.

Moreover, at least one pneumatic remote switch can intercept a conductor that connects the series of electrical generators to an external network.

The electrical generators can, in particular, be photovoltaic panels; or batteries, generators, or the like.

The control unit can be arranged to start up the electric energy generating plant, carrying out the following operations:

opening a control valve, which connects the pneumatic circuit to a compressed air source;

checking whether a closing pressure has been reached inside the pneumatic circuit, which makes the remote switches close;

once said closing pressure has been reached, activating the inverters that connect the electrical generators to an external network.

The reverse operations (deactivation of inverter, checking whether the opening pressure has been reached, closing the control valve) can, on the other hand, be carried out to stop the plant.

Further features and advantages of the subject-matter of the present invention will become clearer by examining the description of a preferred, but not exclusive, embodiment of the invention, illustrated for the purpose of indication and not of limitation in the attached drawings.

DETAILED DESCRIPTION

Figure 3:
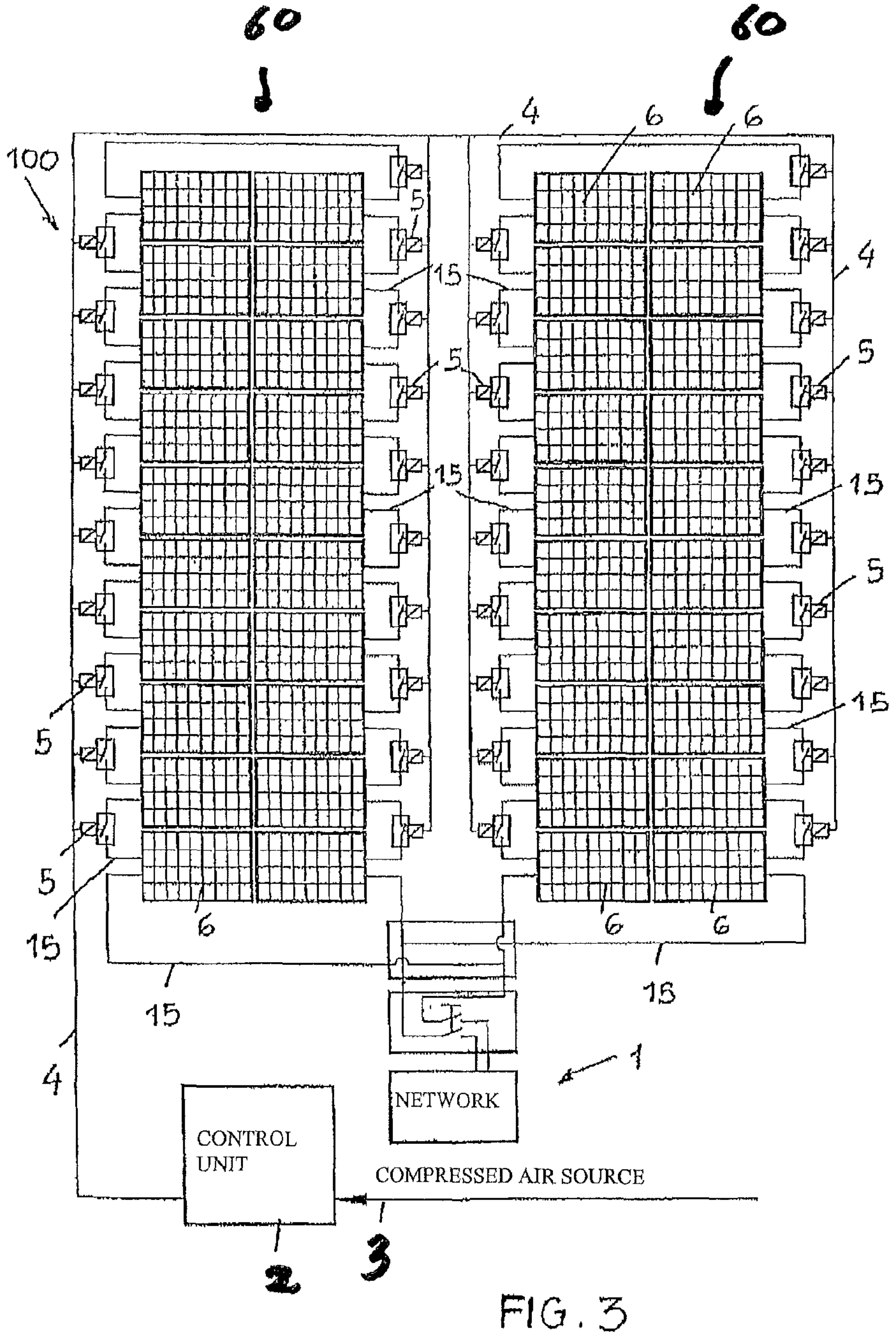
FIG. 3 is a schematic view of a plant using photovoltaic panels equipped with the apparatus of the invention.

Referring to FIG. 3, the apparatus for sectioning an electric energy flow in one or more conductors, according to the invention, globally indicated with reference numeral 1, comprises a control unit (or board) 2, connected to a compressed air source 3 and from which pipes branch off that define a pneumatic circuit 4, which reaches respective pneumatic remote switch devices 5.

Figure 1:
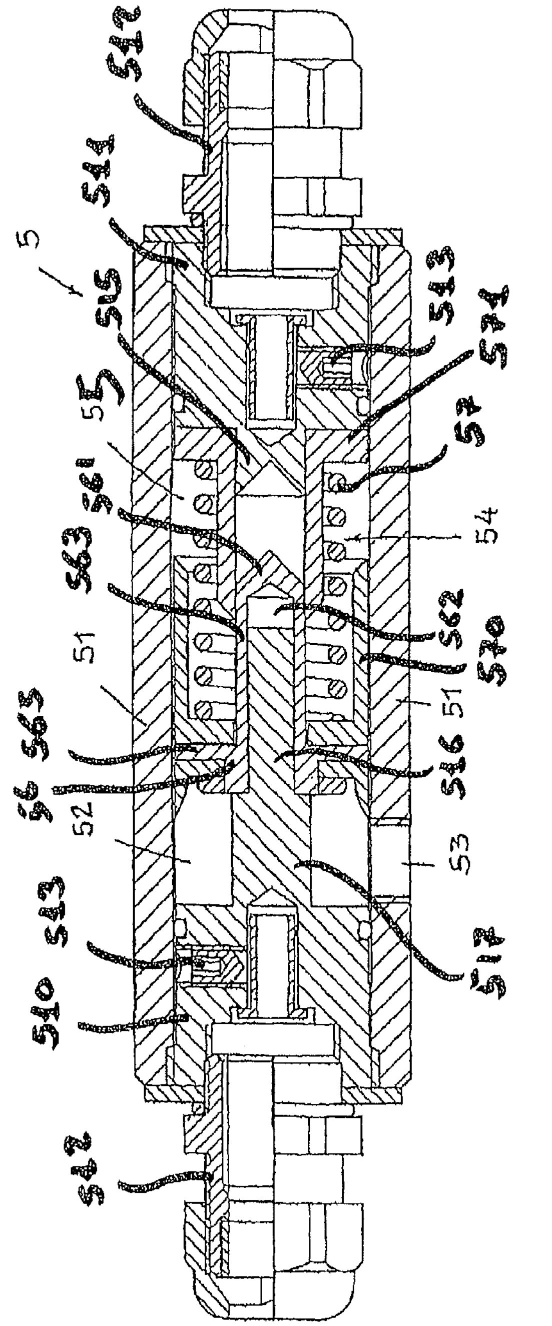
FIG. 1 is a section view of a remote switch device, according to an embodiment of the present invention.
Figure 4:
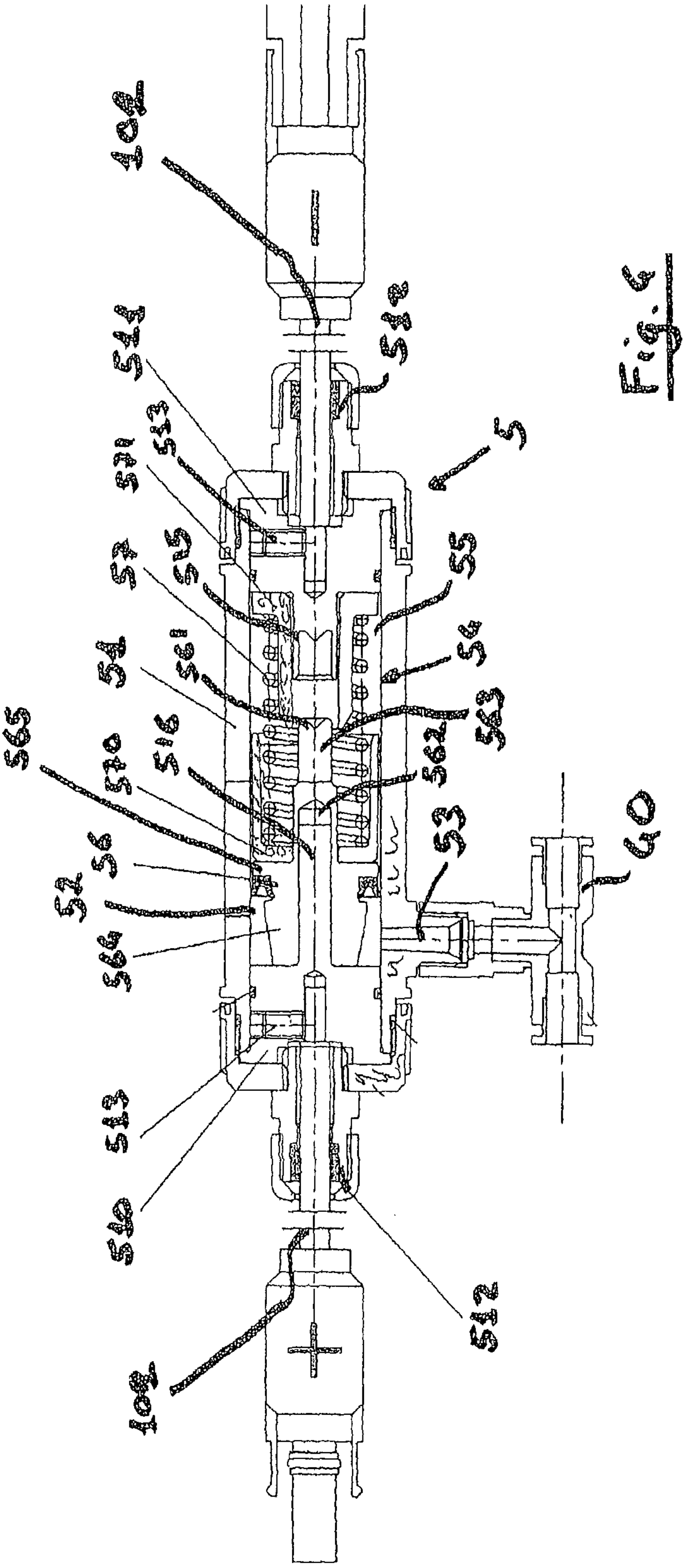
FIG. 4 is a section view of a remote switch device, in open configuration, according to an embodiment of the present invention, which is alternative to that of FIG. 1.
Figure 5:
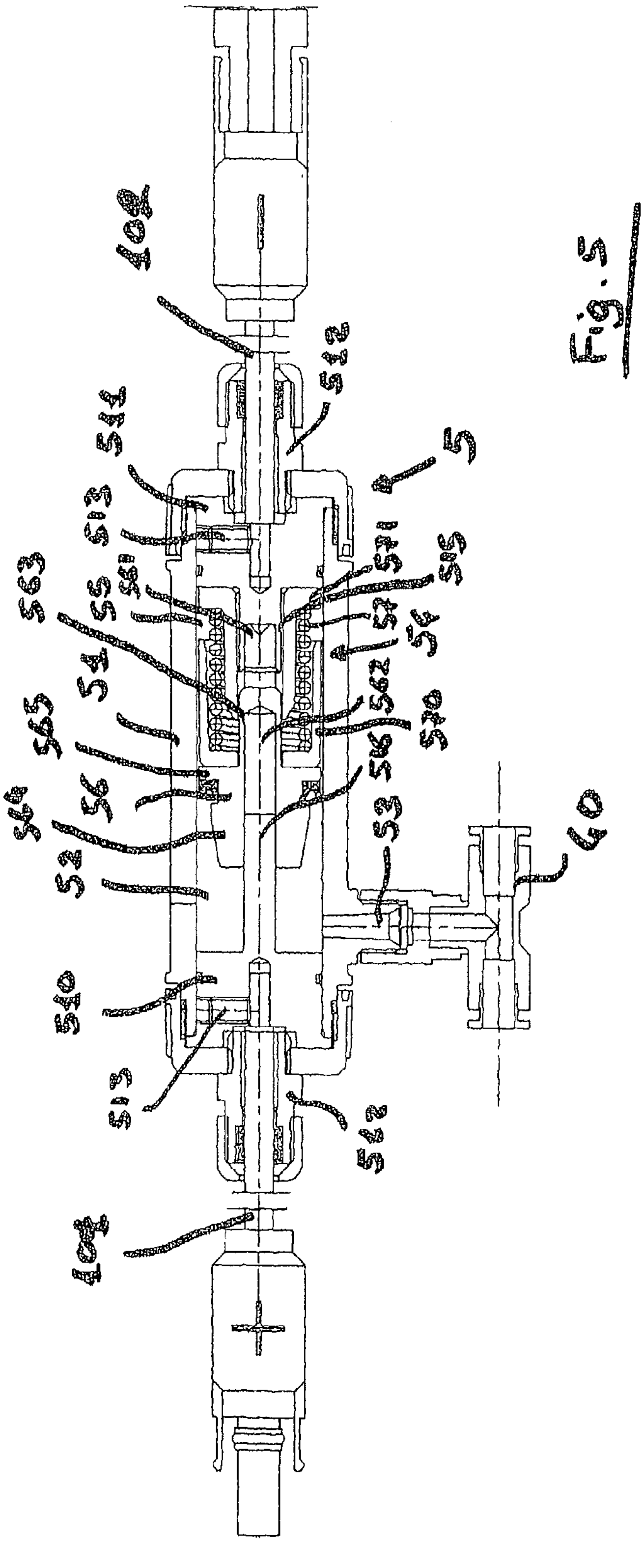
FIG. 5 is a section view of the remote switch device of FIG. 4, in closed configuration.

Now referring to FIGS. 1, 4 and 5, each pneumatic remote switch 5 comprises a casing 51 made from plastic material (preferably rigid Nylon), which defines a first chamber 52, fed through an input 53 connected to the pneumatic circuit 4 seen in FIG. 3

A spring mechanism 54 keeps the electrical contacts closed when the first chamber 52 is under pressure.

If pressure fails, due to an interruption in power supply or due to a tearing of the casing 51, the spring mechanism 54 disconnects the electrical contacts.

The pneumatic remote switch 5 thus represents a normally open contact, which is only kept in closed position when the pneumatic circuit 4 puts the chamber 52 under pressure.

Now moving on to describe the structure of the pneumatic remote switch 5 in greater detail, it should be noted that the casing 51 is in the form of an insulating cylinder closed in a sealed fashion by a first 510 and by a second bottom 511 made from conductive material (preferably brass), on which electrical cables 101, 102 (only visible in FIGS. 4 and 5) are engaged, which connect to an electric plant to be kept in conduction with possibility of sectioning.

On the outer surface of the bottoms 510, 511 a blind seat is indeed formed for such electric cables 101, 102. A cable dowel 513, screwed into a hole normal to the blind seat, also makes it possible—before the insertion of the bottoms 510, 511 in the cylinder 51—to block the cables inside the aforementioned blind seat.

It should also be noted how such cables pass through two cable glands 512, advantageously integrated with insulating covers that close the opposite ends of the casing 51.

Between the first and the second bottom 510, 511 there is a piston 56, sealably slidable in the cylinder 51. The piston is made from conductive material (again preferably brass) and it kept electrically in contact with the first bottom 510. Such a piston 56 hermetically separates the inner volume of the cylinder 51 into two chambers: the aforementioned first chamber 52, arranged on the side of the first bottom 510, and a second chamber 55 arranged on the side of the second bottom 511.

In the variant embodiments described here, the fitting between piston 56 and first bottom 510 is suitably made by inserting a guide stem 516 of the first bottom inside a blind hole 562 that passes through a longitudinal body of the piston 56.

The piston 56 indeed comprises a longitudinal body that extends along the axis of the cylinder 51, and that widens only locally in a plate 565, with a suitable gasket ring, which defines the top of the piston.

In the first variant embodiment represented in FIG. 1, the longitudinal body of the piston 56 comprises just a shank 563 extending inside the second chamber 55. In the second variant embodiment represented in FIGS. 4-5 the longitudinal body also comprises a base 564 intended to space the plate from the first bottom 510 in end stop position; this function is performed in the first variant by a widening 517 of the guide stem 516.

Referring to FIGS. 1, 4 and 5, between the piston 56 and the second bottom 511 there is a helical spring 57, which presses the piston 56 itself towards the first bottom 510. It should be noted that a first 570 and a second 571 guide, both insulating, are respectively arranged between piston 56 and spring 57 and between spring 57 and second bottom 510. Thus there is no electrical connection between piston 56 and second bottom 510 through the spring 57.

The first guide 570 has an annular base that abuts on the second bottom 511; a cylindrical portion, which is wrapped around by the coils of the spring, extends from the base. Such a cylindrical portion is sized to receive the end of the shank 563 of the piston 56 when the latter approaches the second bottom 511.

The second guide 571 is cup-shaped. It has an annular base that abuts on the plate 565 of the piston 56; a cylindrical portion that adheres to the inner wall of the cylinder 51 extends from the base.

The piston 56 comprises a male connector 561 arranged to associate with a respective female connector 515 of the second bottom 511 when the piston 56 is at the end stop near to the second bottom 511, i.e. when the spring 57 is compressed.

The piston 56 takes up such an end stop position—illustrated in FIG. 5 for the second variant embodiment—only when the first chamber 52 is kept under pressure by the pneumatic circuit 4 (seen in FIG. 3), overcoming the elastic force of the spring 57. Only in this position are the connectors 561, 515 connected and an electrical connection is made between the electrical cables 101, 102.

In particular, the male connector 561 is formed at the end of the shank 563 of the piston 56; the female connector is, on the other hand, formed on an axial protuberance of the second bottom 511, surrounded by the cylindrical portion of the second guide 571.

The connectors have different geometries in the first and in the second variant embodiment. In the first variant, depicted in FIG. 1, the male connector 561 has a conical shape that engages a corresponding seat of the axial protuberance of the second bottom 511. In the second variant, instead, the male connector 561 is defined by a cylindrical body, on the extreme surface of which a conical recess is formed. The female connector 515 is correspondingly counter-shaped.

The sectioning apparatus 1 according to the preferred variant embodiments described here is applied to the electric energy generating plant 100 of FIG. 3, in this case a photovoltaic array. Such a plant comprises a plurality of electrical generators 6, in particular photovoltaic panels, connected in series through conductors 15. In this specific case, the photovoltaic panels 6 define two strings 60 of twenty panels 6 connected in series; the two strings are connected in parallel with one another. The pneumatic remote switches 5 intercept the conductors 15 of the electrical generators, in this case photovoltaic panels 6, both inside the structure and outside of it, according to the requirements and according to the type of remote switch used. In other words, each conductor 15 intercepted by a pneumatic remote switch 5 is made up of two electric cables 101, 102 connected to the device according in the way described earlier and illustrated in FIGS. 4, 5.

In particular, the pneumatic remote switches 5 intercept all of the conductors 15 that connect a photovoltaic panel 6 in series to the next one inside a string; in other words, between two photovoltaic panels 6 there is always a pneumatic remote switch 6. Thus, in the case of sectioning, every photovoltaic panel 6 is insulated with respect to the other panels of the array.

Moreover, it is possible to envisage a further remote switch, also of the conventional type, to section the connection of the entire photovoltaic array 100 to the network.

The sectioning apparatus 1, as stated above, comprises, in addition to the pneumatic remote switches 5, the pneumatic circuit 4 intended to actuate them, as well as a control unit 2 of said circuit.

The pneumatic circuit 4, as can be seen in FIG. 3, implies that all of the pneumatic remote switches 5 be connected to the same branch, so that a single pneumatic signal is sent to the plurality of remote switches.

In particular, most of the pneumatic remote switches 5 can be connected to the pipes of the circuit by means of a T-fitting 40, which is seen in FIGS. 4, 5; alternatively, an L-fitting will be used to fasten the pneumatic remote switches 5 arranged at the end of a string 60.

Figure 2:
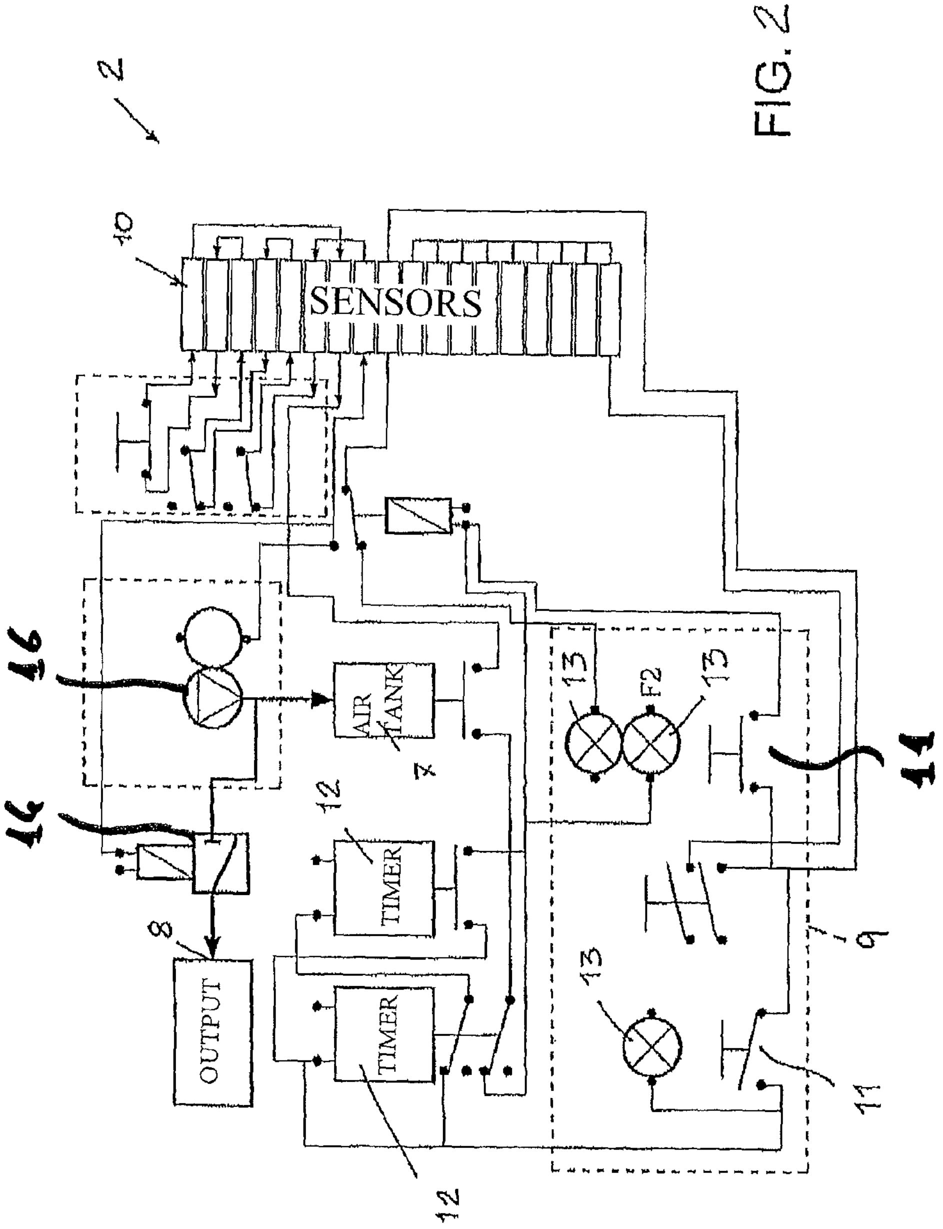
FIG. 2 represents an electric control diagram of the apparatus according to the present invention.

The control unit 2, in the specific examplying embodiment illustrated in FIG. 2, consists of an electric circuit arranged to control a control valve 14 (which in this case is in the form of an electrically-controlled three-way diverter). The control valve 14 controls the output feed 8 of the pneumatic circuit 4 defined earlier.

Upstream of the control valve 14 there is the aforementioned compressed air source, comprising a compressed air tank 7 fed by means of a compressor 16, also controlled by the control unit 2.

In order to establish when it is necessary to activate the compressor 16, the control unit 2 comprises a manostat (with suitable hysteresis) associated with the compressed air tank 7.

A further end-of-line manostat (not visible in the figures) can be used to evaluate the end-of-line pressure, i.e. at the most remote end of the pneumatic circuit 4.

It should be noted that the control unit 2 can be arranged to emit a warning signal when there is an excessive number of activation requests of the compressor 16, since such a phenomenon can be indicative of a leak in the pneumatic circuit 4.

The control unit can also receive input signals for emergency manual interruptions, by means of switches arranged in a manual interruption block globally indicated with reference numeral 9, and also signals that result in automatic interruptions, sent by danger detectors 10 like, for example, smoke detectors, temperature sensors, etc.

The pneumatic remote switches 5 are connected to the compressed air network and, once the set pressure has been reached, close the electrical contact, of the normally open type, allowing conduction between the generators and therefore the circuiting of the entire electrical array or, possibly, of certain sections (of course adopting an architecture of the hydraulic circuit alternative to the one illustrated in FIG. 3), according to the most varied operating logics.

In the case of a loss of air pressure, either voluntary through manual actuation, or because of an emergency, for example because the pipes have been torn due to a flame, below a set closing pressure of the pneumatic remote switch 5, the electrical contact opens, sectioning the conduction between the single electrical generators 6 of the plant 100.

In practice, in the photovoltaic array 100, visible in FIG. 3, it is obtained a separation of each single panel 6 of the relevant string, thus securing the entire plant 100.

Still referring to FIG. 2, the control unit 2 ensures that the apparatus 1 is controlled through the following functions, illustrated as an example:

manual switching on and off, through switches 11 (in particular, a plant start switch and a plant stop switch);

programmable automatic switching on and off, through timers 12;

indication of the operating state, through light indicators 13;

control of the compressed air source;

control of the feed of compressed air of the pneumatic plant;

inputs for possible danger detectors 10.

It should be noted that the control unit 2 described above can be made according to different modes and architectures from the one proposed in FIG. 2; in particular, some of the logics made through electric circuits can be suitably implemented electronically inside one or more processing units. It is also possible to provide a control unit 2 of another type, for example pneumatic.

The control logic implemented by the control unit 2 involves a start manoeuvre and a stop manoeuvre of the electric energy generating plant 100. Such manoeuvres are activated by plant start and stop controls, which can be entered manually by means of the switches 11.

In the plant start manoeuvre, a first step consists of opening the control valve 14, which creates a predetermined closing pressure inside the pneumatic circuit 4 causing the remote switches 5 to close.

Once the closing pressure has been reached, as detected by the end-of-line manostat, a second step is carried out that finalizes the switching on of the plant 100, activating the inverters that connect the plant to the network.

Vice-versa, the plant stop manoeuvre involves the deactivation of the inverters as a first step, and then, once an opening pressure has been detected by means of the end-of-line manostat, a second step of closing the control valve 14.

The control logic can advantageously comprise automatically performing, in preset cycles, a plant stop manoeuvre followed by a plant start manoeuvre. The sequence of manoeuvres can be carried out, for example, every 24 hours, preferably at night-time when the photovoltaic array does not produce energy, and it enables to prevent mechanical shutdowns due to the prolonged inactivity of the remote switches.

The control logic can also envisage a trial function, during which the plant start and stop manoeuvres are alternately repeated a certain number of times in succession (for example 100).

The pneumatic feeding apparatus object of the present invention has numerous advantages with respect to a conventional electric plant.

An important advantage is given by the use of pipes made from non-conductive plastic material, which cannot constitute a possible source of dispersion of electric currents towards people and structures, unlike conventional copper cables whose coatings, in the case of tearing by fire, can lose insulating power and transmit current.

The pipes made from plastic material also provide an important automatic safety function since, in the case of a fire, when the flames or the temperature cause them to get torn in any point of the pneumatic circuit 4, there is a loss of pressure with consequent loss of pressure in the entire plant, making the contacts of all of the remote switches open and interrupting the various connections between the electrical generators.

In a conventional sectioning apparatus with magnetic or electronic remote switches, fed by copper cables, in the case of a fire the outer insulating sheath of the cables burns first, whereas the copper conductor resists up to the melting temperature, therefore leaving the plant live and feeding the various remote switches whose intervention is substantially delayed.

The pneumatic sectioning apparatus according to the present invention makes it possible to control the pneumatic transducers 5 by simply supplying or removing compressed air and therefore, by means of pneumatic devices available on the market, it is possible to create greatly varied operating logics both for safety and for other purposes.

For example, it is possible to position different mushroom push buttons for manually blocking the plant in the strategic points of the building as envisaged in the safety plan or to optimise the operation of the plant.

In practice, it has been noted that the invention achieves the predetermined object and purposes.

Of course, the materials used, as well as the sizes, can be whatever according to requirements.

The invention claimed is:

1. An apparatus for sectioning an electric energy flow in one or more conductors of an electric energy generating plant, comprising:

a control unit;

a pneumatic circuit controlled by said control unit; and a plurality of pneumatic remote switches fed by said pneumatic circuit; and said pneumatic remote switches intercepting conductors of an electric energy generating plant;

said pneumatic remote switches being of the normally open type, the electrical contacts only being closed when the pneumatic circuit is under pressure;

said pneumatic remote switches further comprising at least a covering element made from a tearable plastic material, the tearing of which places the pneumatic circuit in communication with the outside environment and releases pressure of the pneumatic circuit.

2. The apparatus according to claim 1, wherein said pneumatic circuit comprises pipes made from plastic material.

3. The apparatus according to claim 1, wherein each pneumatic remote switch comprises a casing made from plastic material, which defines a first chamber in communication with the pneumatic circuit through an input;

said pneumatic remote switch defining an electrical contact that is only closed when said first chamber is under pressure.

4. The apparatus according to claim 3, wherein said pneumatic remote switch comprises two connectors thereinside, arranged to establish the electrical contact, and a spring mechanism arranged to space apart said connectors, opening the electrical contact when there pressure fails inside the first chamber, due to interruption of power supply or tearing of one of said covering elements made from plastic material.

5. The apparatus according to claim 1, wherein said control unit controls a control valve that connects said pneumatic circuit to a compressed air source.

6. The apparatus according to claim 5, wherein said control unit comprises one or more manostats intended to control the pressure conditions of the compressed air source and/or of the pneumatic circuit.

7. The apparatus according to claim 5, wherein said control unit comprises one or more fire detecting sensors.

8. The apparatus according to claim 5, wherein said control unit comprises timers for automatically switching on and off.

9. An electric energy generating plant comprising a plurality of electrical generators connected in series and a apparatus for sectioning an electric energy flow according to claim 1, the pneumatic remote switches of said apparatus intercepting at least one conductor of said series of electrical generators.

10. The electric energy generating plant according to claim 9, wherein said pneumatic remote switches intercept the conductors that connect an electrical generator to the subsequent electrical generator of the series.

11. The electric energy generating plant according to claim 9, wherein at least one pneumatic remote switch intercepts a conductor that connects the series of electrical generators to an external network.

12. The electric energy generating plant according to claim 9, wherein said electrical generators are photovoltaic panels.

* * * * *